United States Patent
Custance et al.

(10) Patent No.: US 12,459,635 B2
(45) Date of Patent: Nov. 4, 2025

(54) AIRCRAFT CONTROL SURFACE DEPLOYMENT SYSTEM WITH CAM BODY AND ACTUATOR MOVABLE IN FIRST DIRECTION AND SECOND DIRECTION

(71) Applicant: Airbus Operations Limited, Bristol (GB)

(72) Inventors: Denys Custance, Bristol (GB); Marc Lopezboix, Bristol (GB)

(73) Assignee: Airbus Operations Limited, Bristol (GB)

( * ) Notice: Subject to any disclaimer, the term of this patent is extended or adjusted under 35 U.S.C. 154(b) by 42 days.

(21) Appl. No.: 18/514,075

(22) Filed: Nov. 20, 2023

(65) Prior Publication Data
US 2024/0174350 A1    May 30, 2024

(30) Foreign Application Priority Data
Nov. 25, 2022    (GB) .................................... 2217698

(51) Int. Cl.
*B64C 13/32*    (2006.01)
*B64C 9/32*    (2006.01)

(52) U.S. Cl.
CPC .............. *B64C 13/32* (2013.01); *B64C 9/323* (2013.01)

(58) Field of Classification Search
CPC .. B64C 9/02; B64C 9/32; B64C 9/232; B64C 9/34; B64C 9/146; B64C 3/58; B64C 13/00; B64C 13/24; B64C 13/26; B64C 13/28; B64C 13/30; B64C 9/323
See application file for complete search history.

(56) References Cited

U.S. PATENT DOCUMENTS

| | | | |
|---|---|---|---|
| 4,995,575 A | 2/1991 | Stephenson | |
| 5,823,471 A | 10/1998 | Dazet | |
| 8,424,801 B2 | 4/2013 | Wildman et al. | |
| 12,071,221 B2 * | 8/2024 | Bishop | B64C 9/22 |
| 2011/0031347 A1 | 2/2011 | Allen | |

(Continued)

FOREIGN PATENT DOCUMENTS

| | | |
|---|---|---|
| DE | 8714636 U1 | 12/1987 |
| EP | 2669191 B1 | 4/2021 |
| GB | 768463 A | 2/1957 |

OTHER PUBLICATIONS

British Search Report for Application No. 2217698 dated May 18, 2023.

(Continued)

*Primary Examiner* — Arfan Y. Sinaki
(74) *Attorney, Agent, or Firm* — KDW Firm PLLC (57) ABSTRACT

An aircraft control surface deployment system for an aircraft structure, that can be a spoiler deployment system for an aircraft wing, includes a cam body, an actuator, and a coupling mechanism. The actuator moves the cam body such that it raises and lowers the aircraft control surface. The actuator is connected to the cam body via the coupling mechanism. The coupling mechanism has a first portion connected to the cam body and a second portion connected to the actuator, configured such that the coupling mechanism allows some free relative movement and rotation of the first and second portions. Loads transverse to the axis of movement of the actuator, resulting from relative movement of the cam body, are not transferred to the actuator.

20 Claims, 7 Drawing Sheets

(56) References Cited

U.S. PATENT DOCUMENTS

| | | | |
|---|---|---|---|
| 2018/0135735 A1 | 5/2018 | Brakes | |
| 2020/0180750 A1* | 6/2020 | Tsai | B64C 9/20 |
| 2021/0114714 A1* | 4/2021 | Tsai | B64C 9/06 |
| 2022/0315204 A1* | 10/2022 | Bishop | B64C 13/30 |

OTHER PUBLICATIONS

European Extended Search Report in EP Application No. 23210640.1, dated Apr. 11, 2024, 9 pages.

\* cited by examiner

AIRCRAFT CONTROL SURFACE DEPLOYMENT SYSTEM WITH CAM BODY AND ACTUATOR MOVABLE IN FIRST DIRECTION AND SECOND DIRECTION

TECHNICAL FIELD

The present disclosure relates to control surfaces on an aircraft.

BACKGROUND

The disclosure herein concerns deployment of an aircraft control surface. More particularly, but not exclusively, this disclosure herein concerns an aircraft control surface deployment system, an aircraft structure, an aircraft structure in the form of at least part of an aircraft wing, an aircraft, a method of moving an aircraft control surface from a lowered position to a raised position and a method of moving an aircraft control surface from a raised position to a lowered position.

An aircraft spoiler is an example of an aircraft control surface. Spoilers may be arranged such that they are deployed upwardly from an aircraft wing in order to spoil the airflow over the wing, and therefore reduce lift. Such spoilers are commonly positioned on the outboard trailing edge of the wing. There may be several spoilers arranged across the span of the wing.

A spoiler may be arranged to deploy in response to a demand signal received from the pilot or an aircraft control system, for example for the purpose of reducing lift or for load alleviation in the event of gusts. Spoilers must be highly responsive so that they are effective as soon as possible after the demand signal is received.

A locally provided actuator is typically used to drive movement of the spoiler from its stowed/retracted position to its deployed position. It may be that the upper surface of the spoiler, when stowed, forms a part of the upper surface of the wing presented to the airflow and that the spoiler then rotates upwards from the wing when deployed. It is also known to deploy vertically one or more spoilers upwardly from a stowed position within the body of the wing to a deployed position, via an opening in the wing. In such arrangements, very little, if any, part of the spoiler is presented to the airflow on the upper surface of the wing when the spoiler is stowed.

Spoilers are commonly used on gliders, but the force required to raise spoilers on modern jet aircraft that might travel at speeds of around Mach 0.8 is much greater. Actuators of higher specification that can meet the increased force demand while still operating at high speed are usually larger than those for raising spoilers on gliders.

US 20110031347 A1 discloses a spoiler deployment mechanism comprising a scissor linkage mechanism, which is attached to a spoiler and to a wing, and an actuator, which is attached to the wing and the scissor linkage mechanism, such that moving the actuator raises and lowers the spoiler. However, the deployment mechanism would not be suitable for use with an actuator of a higher specification due to the lack of local space around the control surface in the wing.

Thus when seeking to develop or improve a control surface arrangement for an aircraft careful consideration needs to be given to the location of the control surface(s) on the aircraft and how it is (they are) deployed and stowed, which in turn has an impact on the type the actuation mechanism used to cause the motion of the control(s) surfaces between the deployed and stowed positions. The location, size and type of actuator should ideally be chosen such that there is efficient use of space and such that the control surfaces can be reliably and repeatedly operated. On an aircraft it is also important to ensure that any solutions are mass-efficient and do not unnecessarily add significant mass to the aircraft, without any consequential improvement in other aspects of the aircraft and/or its operation.

The disclosure herein seeks to mitigate one or more of the above-mentioned problems. Alternatively or additionally, the disclosure herein seeks to provide an improved aircraft control surface deployment system, an improved aircraft structure, an improved aircraft structure in the form of at least part of an aircraft wing, an improved aircraft, an improved method of moving an aircraft control surface from a lowered position to a raised position and/or an improved method of moving an aircraft control surface from a raised position to a lowered position.

SUMMARY

The disclosure herein provides, according to a first aspect, an aircraft control surface deployment system. The system comprises a cam body for raising an aircraft control surface, an actuator for moving the cam body and a coupling mechanism for connecting the actuator and the cam body. The actuator is moveable in a first direction which moves the cam body in a direction for raising the aircraft control surface and a second direction which moves the cam body in a direction for lowering the aircraft control surface, the second direction being opposite to the first direction. The actuator is positioned adjacent to the cam body such that the actuator is offset from the cam body in a direction transverse to the first direction. The coupling mechanism comprises a first portion connected to the cam body and a second portion connected to the actuator. The coupling mechanism comprises first and second contact points at which the first portion and the second portion meet, such that the first contact point enables the actuator to move the cam body in the first direction, such that the second contact point enables the actuator to move the cam body in the second direction, and such that the coupling mechanism permits movement of the first portion (of the coupling mechanism) relative to the second portion (of the coupling mechanism) in a direction transverse to the first direction. In embodiments of the disclosure herein, the ability to arrange the actuator close to and alongside the cam body enables an efficient use of space.

The direction of travel of the cam body when the actuator moves along the first/second direction will typically be close to parallel, but not exactly parallel, to the first/second direction. There will typically be some misalignment of the directions, typically of +/−3 degrees or less (optionally no more than +/−1 degrees), due to manufacturing tolerances, due to movement/flexing of parts of the aircraft during operation or the like. It is therefore very difficult to ensure that the cam line-of-motion and the actuator line-of-motion are perfectly aligned and parallel, which would if possible be desirable given that the actuator and cam body are adjacent to each other, which means that any misalignment could result in potentially significant lateral forces during movement of the two parts along their respective lines of motion. In some scenarios this could cause jamming which would be highly undesirable. However, in use in embodiments of the disclosure herein, when the actuator moves in the first direction, forces transmitted via the first contact point of the coupling mechanism cause the cam body to move in a direction along, and substantially parallel to, the first direction such that the cam body causes the aircraft control surface to rise (the aircraft control surface moving in a direction which is different from the first direction, typically), with any misalignment in the direction of movement of the actuator and the direction of movement of the cam body being accommodated by the permitted movement of the first portion relative to the second portion (in the direction transverse to the first direction) of the coupling mechanism.

Similarly, in such embodiments, when the actuator moves in the second direction, it causes the cam body to move in a direction along, and substantially parallel to, the second direction such that the cam body causes the aircraft control surface to lower (the aircraft control surface moving in a direction which is different from the second direction, typically), with non-parallel movement of the actuator and cam body being accommodated by the permitted relative movement of the first and second portions of the coupling mechanism.

It will be understood that the actuator may be configured to exert and withstand high loads in the first and/or second direction (for example at least 1000 Newtons), the first and second directions being parallel to the direction of the stroke/axis of motion of the actuator. If and when the motion of the cam body and motion of the actuator are perfectly aligned, loads are transferred between the cam body and the actuator in the first and/or second directions via the coupling mechanism, with no lateral loading. In cases of misalignment, the cam body moves with respect to the actuator in (a) direction(s) not parallel to the first and second directions. The control surface deployment system, particularly if the actuator is capable of high load and high speed, may not be able to sustain the large lateral loads perpendicular to its stroke/axis of motion that might otherwise be caused absent the relative movement permitted by the coupling mechanism. It will be understood for example that the first and second portions of the coupling mechanism may avoid a component of load that is transverse to the direction of the actuator stroke/first and second directions being transferred (wholly or partially) to the actuator, preferably reducing the lateral loading to zero or close to zero. In certain embodiments of the disclosure herein as will be described in further detail below, the coupling mechanism may be arranged such that twisting or rotational loading of the actuator/cam body can be reduced and/or avoided.

The coupling mechanism permitting movement of its first portion relative to its second portion in the transverse direction may be facilitated by the first contact point being between a first surface on one of the first and second portions and a corresponding second surface on the other of the first and second portions such that when the actuator moves in the first direction, contact is maintained between the two surfaces but the location of the contact moves relative to one of the first and second surfaces in the direction transverse to the first direction. Thus, there may therefore be sliding contact between the first and second surfaces. Similarly, the second contact point may be between two respective surfaces on the first and second portions, respectively, such that when the actuator moves in the second direction sliding contact is maintained between the two surfaces, thus permitting relative movement in the transverse direction of the first and second portions of the coupling mechanism.

As mentioned above, the coupling mechanism may be arranged to reduce twisting or rotational loading of the actuator/cam body. This may be achieved by the coupling mechanism permitting rotational movement of its first portion relative to its second portion. For example, it may be that the first contact point is between (a) a first surface on one of the first and second portions and (b) a corresponding second surface on the other of the first and second portions, such that when the actuator moves in the first or second direction, contact is maintained between the two surfaces while permitting relative rotation of the portions of the coupling mechanism about the points of contact of the first and second surfaces.

The actuator is positioned adjacent to the cam body such that the actuator is offset from the cam body in a direction transverse to the first direction. It may be that the cam body is arranged to move linearly and has a path of motion, from one extreme end to the other, with a length equal to the length of the path of motion defined by the stroke length of the actuator. The (notional) envelope which contains all of the cam body as it moves (from one extreme end to the other) is adjacent to and alongside the envelope which contains all the actuator as it moves. The two envelopes may overlap, along the first direction, by at least half of the stroke length of the actuator, preferably by at least 75% (possibly 90%) of the stroke length, and preferably by at least half of the length of the shortest notional envelope, and at least 75% (possibly 90%) of the length of the shortest notional envelope. The length of the cam body in the first/second direction may be greater than or substantially equal to the stroke length of the actuator.

The first portion of the coupling mechanism may be rigidly connected to the cam body. The second portion may be rigidly connected to the actuator. The actuator may be arranged to move in one of the first and second directions such that it is a pushing movement (with the actuator extending). The actuator may be arranged to move in the other of the first and second directions such that it is a pulling movement (with the actuator retracting).

Preferably, one of the first and second portions of the coupling mechanism comprises a first rigid body, the first rigid body having a first face and a second face that is parallel and opposite the first face. The first and second faces of the first rigid body may form a receiving portion. Preferably, the other of the first and second portions of the coupling mechanism comprises a second rigid body, the second rigid body having at least two crowned regions for being in contact with the first rigid body at the first and second contact points.

Crowned regions of a surface protrude or extend beyond the surface such that, when that surface comes in contact with another, for example planar, surface, there is effectively a single point of contact (with a very small area in practice) as opposed to a larger area of contact. Preferably, the coupling mechanism is so arranged that as the crowned region of the surface relative to the surface with which it contacts, the location of the point of contact on the crowned region can also move. This (the location of the contact point on crowned region moving) may be facilitated as a result of the crowned region being rounded.

The second rigid body may sit within a receiving portion (e.g. as mentioned above) of the first rigid body.

Preferably, the second rigid body is rounded. The second rigid body may be at least partly spherical for example.

The second rigid body having two crowned regions and/or being rounded may enable relative rotational movement of the first and second portions. With such an arrangement it may be possible for the coupling mechanism to permit movement with as many as five degrees of freedom, preferably with each of five degrees of freedom (e.g. the other, sixth, degree of freedom of movement being linear motion along the first or second direction of moment of the actuator).

The diameter of the second rigid body may be between 10 mm and 200 mm, for example between 45 mm and 150 mm. It may be that the diameter of the second rigid body is 100 mm or less, for example less than 75 mm.

It may be that the first portion of the coupling mechanism is arranged so that it always moves with the cam body (e.g. the first portion of the coupling mechanism is integral with, or otherwise rigidly mounted to, the cam body. It may be that the second portion of the coupling mechanism is arranged so that it always moves with the actuator (e.g. the second portion of the coupling mechanism is integral with, or otherwise rigidly mounted to, the actuator).

Preferably, at least one of the first and second portions of the coupling mechanism is metal. Preferably, both of the first and second portions of the coupling mechanism are metal. In embodiments, the contact points between the metallic surfaces may have a sufficiently low coefficient of friction to allow enough movement of the first portion relative to the second portion of the coupling mechanism. Metal is durable and is resistant to wear during use. The metal used if preferably one that is not likely to corrode. The metal may for example be stainless steel.

Preferably, the actuator has a stroke length, the stroke length being between 150 mm and 500 mm, possibly less than 400 mm—for example being between 200 mm and 300 mm.

Preferably, the cam body has a cam surface arranged to be followed by a cam follower, the cam follower being connected to the aircraft control surface being raised (or lowered). There may be multiple cam followers arranged to follow the cam surface, each cam follower causing movement of a separate aircraft control surface. The cam followers may be arranged in pairs, each pair of cam followers causing movement of a separate aircraft control surface. The span of movement of such a cam follower may be between 0.1 and 2 times the stroke length of the actuator. The span of movement of the cam follower may be between 150 mm and 500 mm. The length of the cam body may be greater than the stroke length of the actuator.

Preferably, the aircraft control surface deployment system is so arranged that a contact axis, defined as a notional straight line that extends through each of the two contact points, is substantially parallel to the first and second directions. Particularly, the contact axis may be defined as the notional straight line between (i) the location of the first contact point on the first or second portion when the cam body is moving in the first direction, and (ii) the location of the second contact point on the first or second portion when the cam body is moving in the second direction. It may therefore be that the movement of the first and second portions of the coupling mechanism is only constrained in one direction, that direction being substantially parallel to the first and second directions.

According to a second aspect of the disclosure herein there is also provided an aircraft structure (for example a wing) comprising the aircraft control surface deployment system described or claimed herein. The aircraft control surface may be in the form of a spoiler, or air brake or the like. The aircraft control surface is arranged such that movement of the actuator in the first direction causes the cam body to move in a way that raises the aircraft control surface, and such that movement of the actuator in the second direction causes the cam body to move in a way that lowers the aircraft control surface. A cam follower as mentioned above may also form part of the system.

Preferably, the aircraft control surface is at an edge of an aerofoil surface, being a leading edge or a trailing edge, of the aircraft, and the actuator and the cam body both extend in a direction that is aligned with the edge. The aerofoil surface may be a wing of an aircraft.

According to a third aspect of the disclosure herein there is also provided an aircraft structure in the form of at least part of an aircraft wing (or possibly an entire wing). The wing comprises one or more (preferably multiple) control surface devices arranged along an edge of the wing, being a leading edge or a trailing edge. The wing also comprises an elongate cam body moveable by a linear actuator. The elongate cam body is arranged along a cam axis. When the cam body is moved along the cam axis in one direction it causes the control surface device(s) to move to a fully deployed position, and when moved along the cam axis in the opposite direction it causes the control surface device(s) to move away from the deployed position. The linear actuator includes an actuator body and an actuator rod which is arranged to drive the cam body, the rod moving along an actuation axis, by extending from or retracting into the actuator body, so as to move the cam body in a direction along the cam axis. The actuator and cam body both extend in a direction along the edge (the leading edge or the trailing edge) and are arranged side by side with respect to each other. The cam axis is in the same direction as the actuation axis. It is preferred that the cam axis is substantially parallel to the actuation axis. However, it is typically the case that the cam axis cannot be guaranteed in use to be always perfectly parallel to the actuation axis. Movement of the cam body by the actuator is arranged to be via a coupling. The coupling comprises a first pair of surfaces which transmit the forces necessary for the rod to drive the cam body in one direction along the cam axis as a result of one surface of the pair pushing against the other surface of the pair in a direction that is (i) substantially perpendicular to at least one of the two surfaces at a point of contact therebetween and also (ii) substantially parallel to the actuation axis, while simultaneously allowing sliding motion between the surfaces to alleviate any loads resulting from misalignment of the cam axis and the actuation axis. Similarly, the coupling further comprises a second pair of surfaces which transmit the forces necessary for the rod to drive the cam body in the opposite direction along the cam axis as a result of one surface of the pair pushing against the other surface of the pair in a direction that is (i) substantially perpendicular to at least one of the two surfaces at a point of contact therebetween and also (ii) substantially parallel to the actuation axis, while simultaneously allowing sliding motion between the surfaces to alleviate any loads resulting from misalignment of the cam axis and the actuation axis.

Above it is stated that when the elongate cam body is arranged along the cam axis in one direction it causes the control surface device(s) to move to a fully deployed position. It may be that when the elongate cam body is moved along the cam axis in the opposite direction, it causes the control surface devices to move to a stowed position.

The cam axis cannot be guaranteed in use to be always perfectly parallel to the actuation axis as a result of tolerances in manufacture, assembly, movement or rotation of parts when in use, vibration thermal effects and/or flexing of aircraft due to operational loads. However, embodiments of the third aspect of the disclosure herein allow sliding motion between the surfaces of the coupling between the cam body and the actuator which facilitates alleviation of any loads resulting from misalignment of the cam axis and the actuation axis.

According to a fourth aspect of the disclosure herein there is also provided an aircraft including the aircraft structure as described or claimed herein.

According to a fifth aspect of the disclosure herein there is also provided a method of moving an aircraft control surface between a lowered position and a raised position. The aircraft control surface may be part of an aircraft control surface deployment system and/or an aircraft structure as described or claimed herein. The method may comprise the step of actuating an actuator in a first direction, the actuator moving a cam body via a contact point between two surfaces that transmits load in the first direction while allowing movement between the two surfaces in a direction transverse to the first direction; the actuator being positioned adjacent to and alongside the cam body.

The method may comprise moving the aircraft control surface from the lowered position to the raised position. The method may comprise moving an aircraft control surface from the raised position to the lowered position. This may comprise a step of actuating an actuator in a second direction, the actuator moving the cam body via a contact point between two surfaces that transmits load in the second direction while allowing movement between the two surfaces in a direction transverse to the second direction.

Preferably, the contact point between the two surfaces when moving the aircraft control surface from the lowered position to the raised position is a different from, and preferably opposite, the contact point between the two surfaces when moving the aircraft control surface from the raised position to the lowered position. Preferably, the contact points are opposite to each other in a direction parallel to the first and/or second direction.

Preferably, the method includes allowing of sliding movement along one of the two surfaces in order to allow movement between the two surfaces in the transverse direction.

Preferably, one of the two surfaces is formed by a first portion of a coupling mechanism and the other of the two surfaces is formed by a second portion of the coupling mechanism, the first portion being connected to the cam body and the second portion being connected to the actuator; such that the allowing of movement between the two surfaces in the transverse direction allows transverse movement between the cam body and the actuator as a result of movement of the first portion of the coupling mechanism relative to the second portion of the coupling mechanism.

Preferably, the two surfaces comprise a first surface and a second surface wherein the first surface is crowned or rounded and the second surface is substantially flat.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft.

According to a sixth aspect of the disclosure herein there is also provided a coupling device suitable for use as the coupling or coupling mechanism as described or claimed herein or for use in the method of moving an aircraft control surface as described or claimed herein, for example to provide the two surfaces that have a contact point therebetween. Such a coupling device may be provided with, or without, the cam body mentioned above. Such a coupling device may have application in relation to coupling linear motion of two parallel moving bodies (that may not be, and are likely not to be, exactly parallel in practice) so that there is single constrained direction of linked motion, and multiple (e.g. 5) degrees of freedom of unconstrained (possibly within limits) motion, whether either body is a cam body, or not.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only with reference to the accompanying schematic drawings of which.

DETAILED DESCRIPTION

Figure 1:
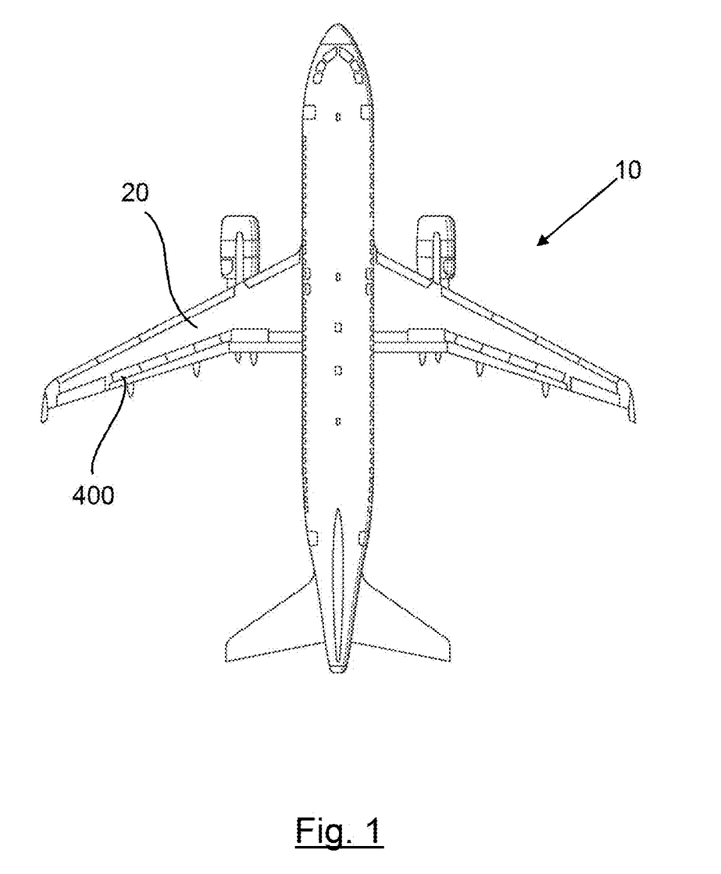
FIG. 1 shows a plan view of an aircraft, having an aircraft structure and an aircraft control surface wherein the aircraft, aircraft structure and aircraft control surface are suitable for use with the aircraft control surface deployment system according to an embodiment of the disclosure herein.

FIG. 1 shows an aircraft 10 comprising two wings 20. A plurality of spoilers 400 are arranged on the upper wing surface along the trailing edge of the wing 20. The aircraft 10 flies at speeds of up to Mach 0.8.

An aircraft control surface deployment system in accordance with a first embodiment of the disclosure herein is now described with reference to FIGS. 2 to 4b.

Figure 2:
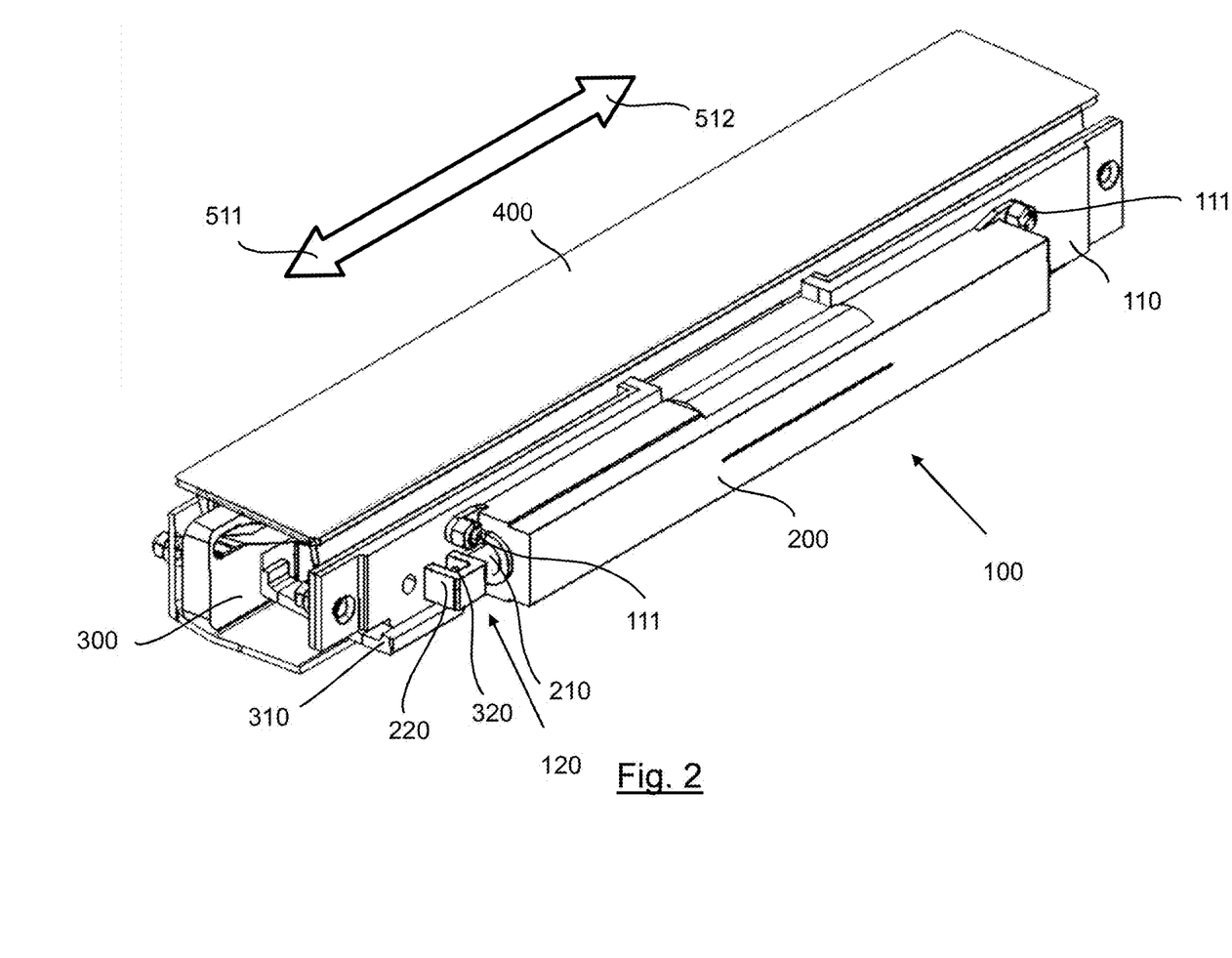
FIG. 2 shows an isometric view of an aircraft control surface deployment system according to a first embodiment of the disclosure herein.

FIG. 2 shows a spoiler deployment system 100 for raising a spoiler 400. It is arranged spanwise along the trailing edge of the wing.

An actuator 200, specifically the push rod 210 of the actuator 200, is moveable in a first direction 511 effecting translation of a cam body 300 in a direction substantially parallel to the first direction 511 to raise the spoiler 400. The push rod 210 also moves in a second direction 512 causing movement of the cam body 300 in a direction substantially parallel to the second direction 512 to lower the spoiler 400. The first direction 511 and the second direction 512 are both approximately parallel to the adjacent trailing edge of the wing.

The cam body 300 is positioned beneath and extends along the length of the spoiler 400. The cam body 300 has a length 900 mm. The cam body 300 can translate along a translation axis, the translation axis being parallel to its length and substantially parallel to the first and second directions 511, 512. The cam body 300 runs on rails (not shown) which are parallel to its translation axis and has a range of 150 mm. The cam body 300 has two cam followers (not shown) which are each in contact with an arm (not shown). The cam followers have a profile such that when the two cam followers move with the cam body 300, the arms rotate in the anticlockwise sense. The spoiler 400 is mounted on the rotating arms such that, when the arm rotates, the spoiler 400 moves vertically upwards. The spoiler 400 moves vertically upwards/is raised until it arrives at its deployed position. The upper surface of the spoiler 400 in the deployed position is 100 mm above where it is in the lowered position. Then, when the cam body 300 translates on its rails along the translation axis in the opposite direction, the two cam followers also move in that direction, the arms rotate in the clockwise sense and thus the spoiler 400 moves vertically downwards i.e. it is lowered, until it arrives in its lowered position.

The spoiler 400 moves vertically upwards/is raised until it arrives at its deployed position. The upper surface of the spoiler 400 in the deployed position is 100 mm above where is in the lowered position. Then, when the cam body 300 translates on its rails along the translation axis in the opposite direction, the two cam followers also move in that direction, the arms rotate in the clockwise sense and thus the spoiler 400 moves vertically downwards i.e. it is lowered, until it arrives in its lowered position.

The linear actuator 200 is connected to the cam body 300 via a coupling mechanism 120. The linear actuator 200 is configured to push/extend in the first direction 511 and pull/retract in the second direction 512. The linear actuator 200 provides the driving force for moving the cam body 300. The linear actuator 200 is fixed to the housing 110 with bolts 111. In other embodiments, the linear actuator 200 may be fixed to the housing 110 by other fixing structures. The linear actuator 200 has a stroke of 140 mm and can function under loads of up to 1,000 N or more (i.e. a force equivalent to a weight of ~100 Kg or more, possibly 200 Kg) along its axis of motion.

The wing flexes in use and as a result of this, and/or manufacturing and/or assembly tolerances, it is typically the case that the line of (linear translational) motion of the cam body 300 is not always perfectly parallel and aligned to the line of motion of the push rod 210 of the actuator 200 when moving in the first direction 511 and/or the second direction 512.

The coupling mechanism 120 is connected to the cam body 300 and to the actuator 200. The part of the coupling mechanism 120 that is connected to the cam body 300 comprises a ball portion 320. The ball portion 320 is connected to one end of the right-angled arm 310. The opposite end of the right-angled arm 310 is rigidly mounted to the cam body 300. The part of the coupling mechanism 120 that is connected to the actuator 200 comprises a cup portion 220. The cup portion 220 is rigidly mounted to the end of the push rod 210 of the actuator 200. The ball portion 320 is contained within the cup portion 220. The ball portion is spherical and has a diameter of 10 mm.

The ball portion 320 and the cup portion 220 are manufactured from stainless steel. In other embodiments of the disclosure herein, they may be manufactured from other metals or other non-metal materials.

Figure 3A:
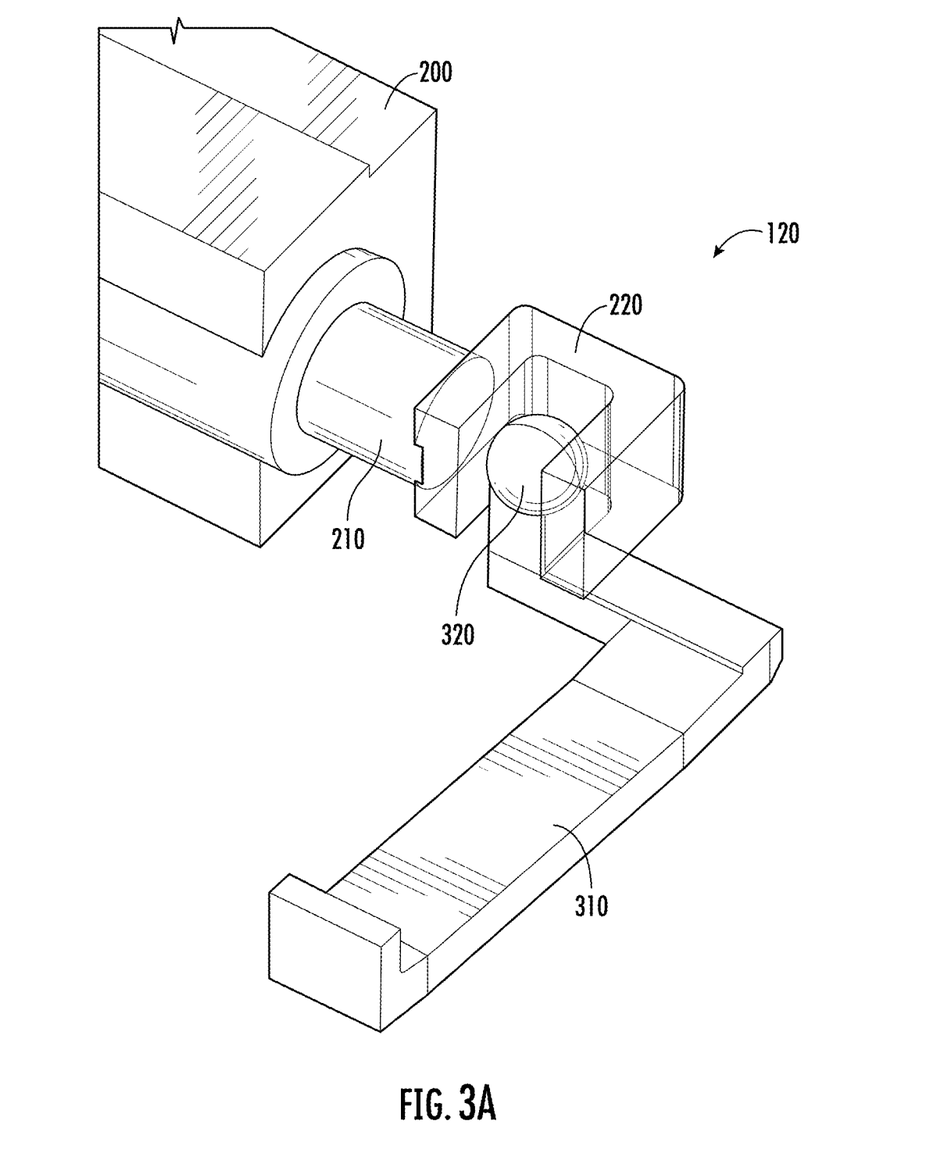
FIG. 3a shows an isometric view of the coupling mechanism of the aircraft control surface deployment system according to a first embodiment of the disclosure herein.
Figure 3B:
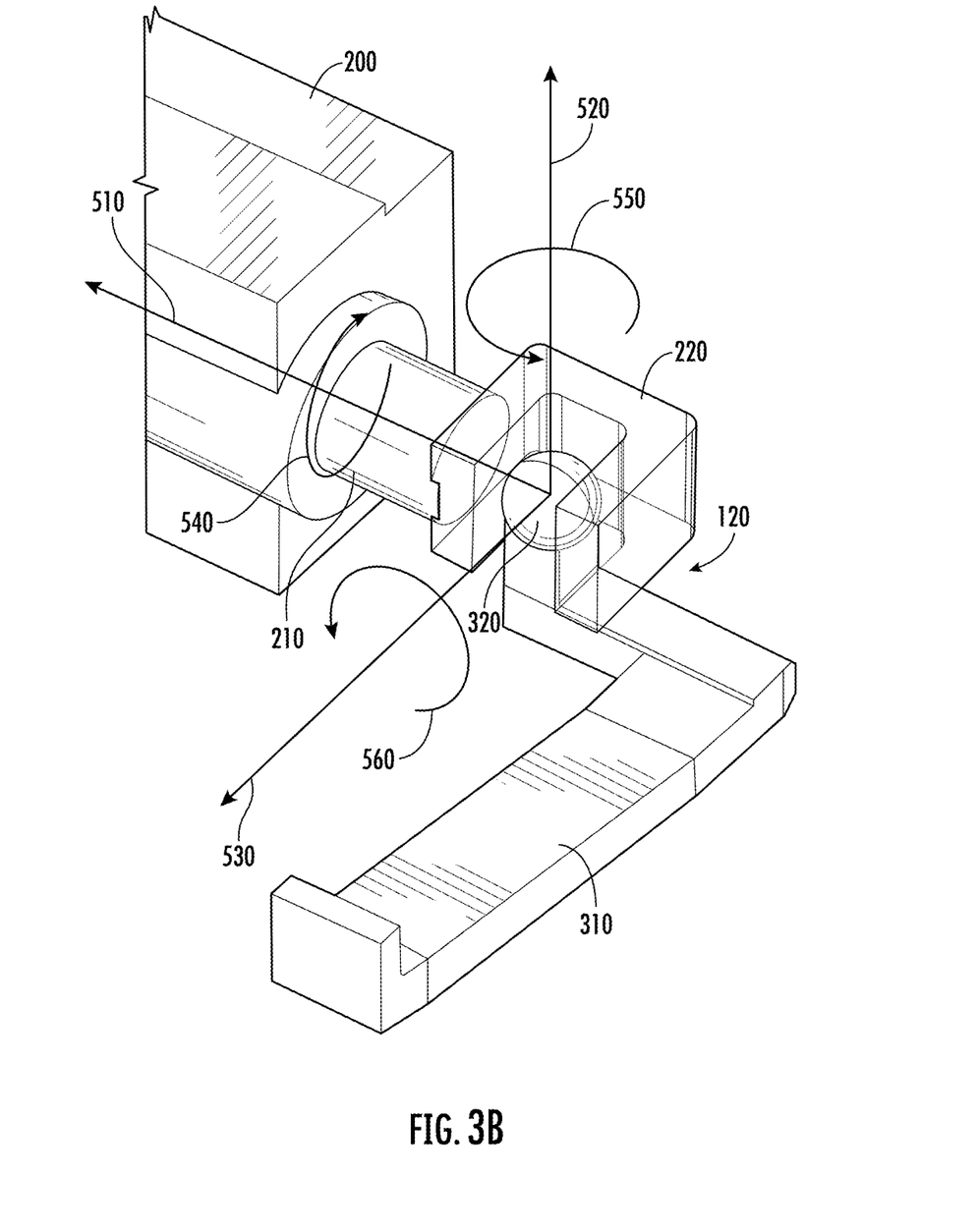
FIG. 3b shows the isometric view of the coupling mechanism of FIG. 3a with six degrees of freedom additionally labelled.

FIGS. 3a and 3b show a close-up view of the coupling mechanism 120 at an angle as viewed from the corner of the cam body that is visible in FIG. 2.

The cup portion 220 is substantially 'C'-shaped with three rigid sides, transverse to each other, and one open end. The distance across the open end is 10 mm and as such the ball portion is close-fit with the cup portion 220. The cup portion 220 is formed of one single rigid component. The flat end of the push rod 210 is fixed to the center of an external face of the 'C'-shaped cup portion 220. The ball portion 320 is held in a central position within the cup portion 220. The center point of the ball portion 320 is substantially in line with the central axis of the push rod 210.

The main body of the right-angled arm 310 is substantially in a plane below the cup portion 220 and, at its ends to which the ball portion 320 is connected, extends upward so that the ball portion can sit within the cup portion 220. The other end of the right-angled arm 310 is rigidly mounted to the cam body 300 (not shown in FIGS. 3a and 3b).

The degrees of freedom of movement of the ball portion 320, which is rigidly connected to the cam body, relative to the cup portion 220, which is rigidly connected to the actuator 200, are shown in FIG. 3b.

The ball portion 320 is fixed in position relative to the push rod 210 along the first axis 510, which is parallel to the first and second directions 511, 512. The ball portion 320 is free to move with respect to the push rod 210 along the second axis 520 and the third axis 530. The first, second and third axes 510, 520, 530 are each perpendicular to each other. The ball portion 320 is free to rotate about each of the first, second and third axes 540, 550, 560 with respect to the push rod 210. The ball portion 320 therefore has 5 unconstrained degrees of freedom with respect to the push rod 210.

Figure 4A:
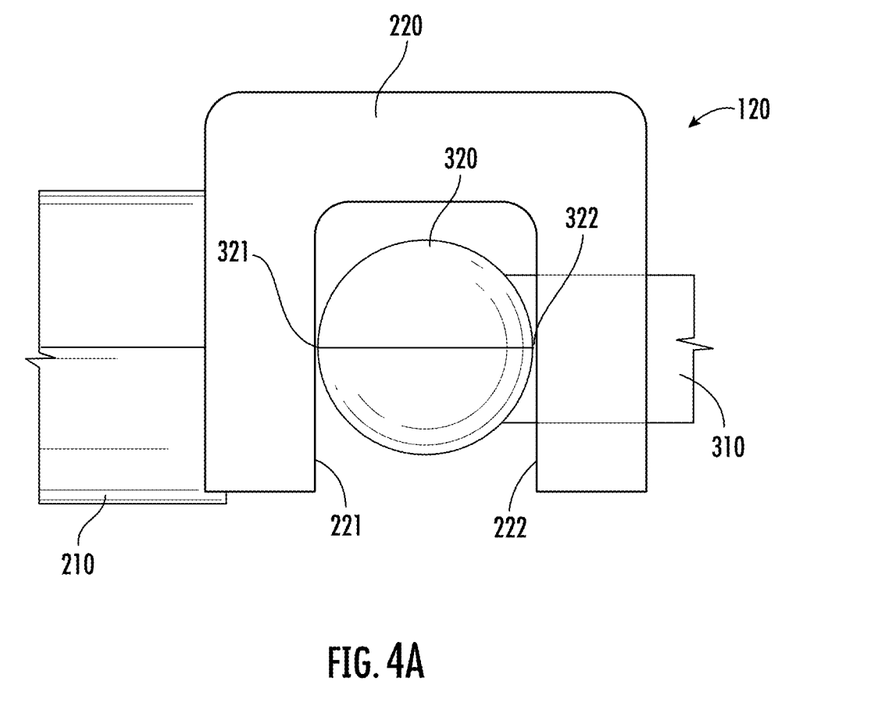
FIG. 4a shows a plan view of the coupling mechanism of the aircraft control surface deployment system according to a first embodiment of the disclosure herein.
Figure 4B:
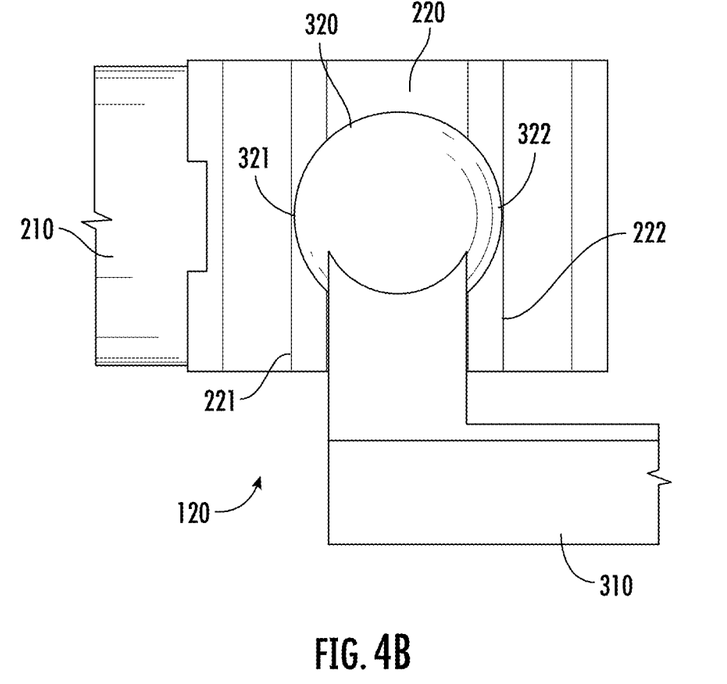
FIG. 4b shows a side view of the coupling mechanism of the aircraft control surface deployment system according to a first embodiment of the disclosure herein.

FIG. 4a shows a plan view of the coupling mechanism 120 and FIG. 4b shows a front view of the coupling mechanism 120. The cup portion 220 has a first inner surface 221 and a second inner surface 222. The two surfaces 221, 222 are parallel and opposite one another. The ball portion 320 is configured to be in contact with the first inner surface 221 and the second inner surface 222 at a first contact point 321 and a second contact point 322, respectively. The cup is slightly wider than the ball (maybe 0.1 mm). As a result, in normal use, the ball portion 320 is only in contact with one of the first inner surface 221 and the second inner surface 222 at any one time.

There is sufficient space between the ball portion 320 and the remaining internal surface of the cup portion 220 such that the ball portion 320 slides within the cup portion 220 and the contact points 321 and 322 move position on the first inner surface 221 and the second inner surface 222. For example, the two contact points 321, 322 move toward the open end of the cup portion 220 as the ball portion 320 moves along the third axis 530.

The diameter of the ball 320 is substantially equal to the distance between the first and second inner surfaces 221, 222. The ball portion 320 can rotate about its two contact points 321, 322. For example, the right-angled arm 310 tilts away from the actuator 200 as a result of movement of the cam body 300, the ball portion 320 rotates clockwise (when viewed as in FIG. 4b), thereby rotating about the third axis 560.

Thus in use, the coupling formed by the ball 320 and cup 220 firmly connects the actuator to the cam in directions along and substantially parallel to the lines-of-motion in the first and second directions 511, 512, while allowing for deflections and movement in all other directions (with 5 degrees of freedom). This is achieved in part by the driving forces being transferred from the actuator (cup) to the cam (ball) when moved in the first direction being via a single point of contact, and the driving forces being transferred from the actuator (cup) to the cam (ball) when moved in the second direction also being via a single (different) point (on the opposite side of the ball). Such a single point of contact permits rotation and sliding movement and is not capable of transmitting any significant lateral/twisting loads between actuator and cam body. In other words, the ball is free to slide vertically or laterally in the cup, and therefore cannot transmit corresponding loads. Without such freedom of movement, and isolation of certain forces between cam and actuator, in cases where the cam line-of-motion and the actuator line-of-motion are not perfectly aligned, there might be a risk of significant lateral forces being transmitted as the components in the mechanism are pulled sideways, potentially leading to undesirable wear, excessive loading and/or jamming of the spoiler deployment mechanism.

Figure 5:
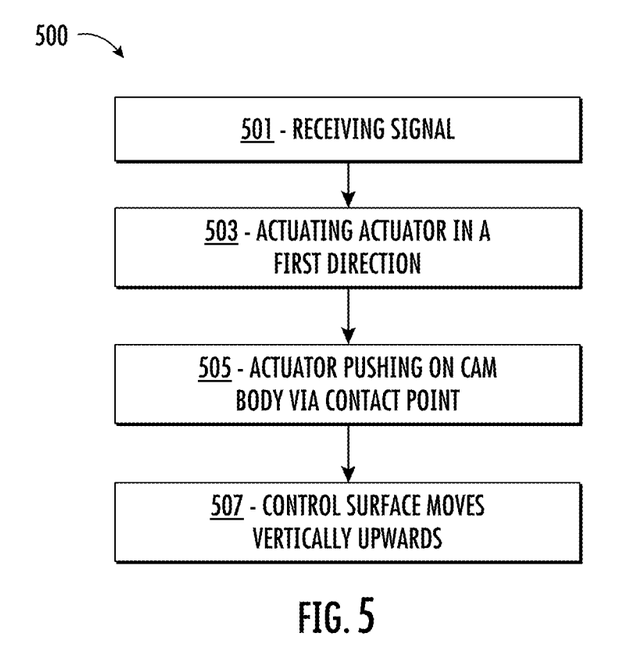
FIG. 5 shows a flowchart of a method of moving an aircraft control surface from a lowered position to a raised position according to a second embodiment.

FIG. 5 shows a flowchart of a method 500 of moving a spoiler from a lowered position to a raised position, the spoiler for example being one as described above in relation to the other Figures. The method 500 has a first step 501 in which a signal is received. The method 500 has a second step 503 in which, in response to the signal, an actuator is actuated in a first direction. The actuator pushes on a cam body via a coupling mechanism. As such, the method 500 has a third step 505 of the actuator pushing on the cam body via a contact point. The coupling mechanism allows movement at the contact point between two of its surfaces in a direction transverse to the first direction. The actuator is positioned adjacent to and alongside the cam body. The method has a fourth and final step of 507 of moving the control surface vertically upwards. It will be appreciated that some of the steps may occur in parallel (or at least partly simultaneously). As such the control surface is in position to disrupt airflow across the wing and alleviate loading on the wing by reducing the lift.

Figure 6:
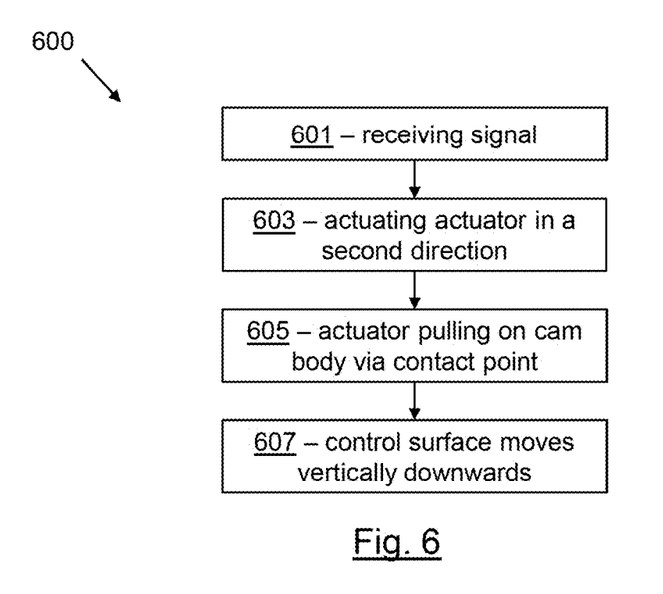
FIG. 6 shows a flowchart of a method of moving an aircraft control surface from a raised position to a lowered position according to a third embodiment.

FIG. 6 shows a flowchart of a method 600 of moving a spoiler from a raised position to a lowered position. The method 600 has a first step 601 in which a signal is received. The method 600 has a second step 603 in which, in response to the signal, an actuator is actuated in a second direction. The second direction is parallel and opposite the first direction of the method 500 shown in FIG. 5. The actuator pulls on a cam body via a coupling mechanism. As such, the method 600 has a third step 605 of the actuator pulling on the cam body via a contact point. The coupling mechanism allows movement at the contact point between two of its surfaces in a direction transverse to the second direction. The actuator is positioned adjacent to and alongside the cam body. The method has a fourth and final step of 607 of moving the control surface vertically downwards. It will be appreciated that some of the steps may occur in parallel (or at least partly simultaneously). As such the control surface is stowed as part of the aircraft wing until it is next required to be deployed.

While the disclosure herein has been described and illustrated with reference to a particular embodiment, it will be appreciated by those of ordinary skill in the art that the disclosure herein lends itself to many different variations not specifically illustrated herein. By way of example only, certain possible variations will now be described.

The embodiments could have application in relation to an aircraft structure other than a wing and could for example have benefit in relation to a tail-plane. Also, the control surfaces need not be spoilers, nor do they need to be arranged on the trailing edge of the wing. They could for example be in the form of vertically deploying pop-up spoilers arranged at the leading edge of the wing. The spoiler could in other embodiments of the disclosure herein, be a different type of control surface, such as a rudder. The coupling mechanism could be used on any mechanism involving linear motion which requires coupling of a first body and second body such that there is at least one degree of freedom of movement required relative to one another. Thus, some embodiments may have benefit in relation to cases where an actuator does not necessarily move a cam body. In such a case, an embodiment may be one which relates to an actuator moveable in a first direction and a second opposite direction, movement of the actuator in the first direction causing movement of a body in a third direction (optionally in the same direction to the first direction—e.g. substantially parallel), and movement of the actuator in the second direction causing movement of a body in a fourth direction (optionally opposite to the third direction), the actuator preferably being positioned adjacent to the body such that the actuator is offset from the body in a direction transverse to the first direction; and a coupling mechanism comprising a first portion connected to the body, and a second portion connected to the actuator; wherein the coupling mechanism comprises first and second contact points at which the first portion and the second portion meet, such that the first contact point enables the actuator to move the body in the third direction (which may optionally be in the same direction as the first direction), such that the second contact point enables the actuator to move the body in the fourth direction (which may optionally be in the same direction as the second direction), and such that the coupling mechanism permits movement of the first portion relative to the second portion in a direction transverse to the third direction and/or the first direction. The coupling mechanism may be provided separately.

The right-angled arm 310 may be above the cup portion 220, the end to which the ball portion 320 is attached extending downwards such that the ball portion 320 is held within the cup portion 220. The right-angled arm 310 may be substantially in the same plane as the center of the cup portion 220; the end to which the ball portion 320 is attached extending out around the edges of the cup portion 220 before extending into the cup portion 220 such that the ball portion 320 is held within the cup portion 220.

The cup portion 220 may be of any other suitable shape. For example, the cup portion 220 may be a hollow cuboid with one side having a single aperture through which the right-angled arm 310 can extend. Alternatively, the cup portion 220 may have a fully rounded C-shape and have two shafts extending inwards from each of its ends between which the ball portion 320 is held.

The ball portion 320 may be of any other suitable shape. For example, the ball portion may be a solid cube with two opposite faces being crowned such that they come in contact with the two inner surfaces of the cup portion 220 at two single contact points.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments.

The term 'or' shall be interpreted as 'and/or' unless the context requires otherwise.

It should be understood that modifications, substitutions and alternatives of the present invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft control surface deployment system comprising:
   a cam body for raising an aircraft control surface;
   an actuator for moving the cam body, the actuator being moveable in a first direction, for raising the aircraft control surface, and in a second direction, for lowering the aircraft control surface, the second direction being opposite to the first direction, the actuator being positioned adjacent to the cam body such that the actuator is offset from the cam body in a direction transverse to the first direction; and
   a coupling mechanism comprising:
      a first portion connected to the cam body; and
      a second portion connected to the actuator;
   wherein the coupling mechanism comprises first and second contact points, at which the first portion and the second portion meet;
   wherein the cam body, the actuator, and the coupling mechanism are arranged such that:
      the coupling mechanism permits relative movement between the first portion and the second portion, in a direction that is transverse to the first direction;
      when the actuator moves in the first direction, a force transmitted via the first contact point of the coupling mechanism causes the cam body to move in a direction along, and parallel to, the first direction, such that the cam body causes the aircraft control surface to rise;
      when the actuator moves in the second direction, a force transmitted via the second contact point of the coupling mechanism causes the cam body to move in a direction along, and parallel to, the second direction, such that the cam body causes the aircraft control surface to lower; and
      wherein non-parallel movement of the actuator and the cam body, when the actuator moves in the first direction or the second direction, is accommodated by the relative movement between the first portion and the second portion that is permitted by the coupling mechanism.

2. The aircraft control surface deployment system of claim 1, wherein:
   the first portion of the coupling mechanism comprises a first rigid body; and
   the first rigid body comprises:
      a first face; and
      a second face that is parallel to and opposite from the first face.

3. The aircraft control surface deployment system of claim 2, wherein:
   the second portion of the coupling mechanism comprises a second rigid body; and
   the second rigid body comprises at least two crowned regions, which are configured for contacting with the first rigid body at the first and second contact points.

4. The aircraft control surface deployment system of claim 3, wherein the second rigid body is rounded or spherical.

5. The aircraft control surface deployment system of claim 2, wherein:
   the first portion of the coupling mechanism comprises a second rigid body; and
   the second rigid body comprises at least two crowned regions, which are configured for contacting the first rigid body at the first and second contact points.

6. The aircraft control surface deployment system of claim 1, wherein the first portion of the coupling mechanism is integral with, or otherwise rigidly mounted to, the cam body, and/or the second portion of the coupling mechanism is integral with, or otherwise rigidly mounted to, the actuator.

7. The aircraft control surface deployment system of claim 1, wherein at least one of the first and second portions of the coupling mechanism is metal.

8. The aircraft control surface deployment system of claim 1, wherein the actuator has a stroke length between 100 and 300 mm.

9. The aircraft control surface deployment system of claim 1, wherein the system is configured such that a contact axis, that is a straight line that extends through each of the two contact points, is substantially parallel to the first and second directions.

10. An aircraft structure comprising the aircraft control surface deployment system of claim 1, and an aircraft control surface configured such that movement of the actuator in the first direction causes the cam body to move in a way which raises the aircraft control surface, and such that movement of the actuator in the second direction causes the cam body to move in a way which lowers the aircraft control surface.

11. The aircraft structure of claim 10, wherein the aircraft control surface is at an edge of an aerofoil surface, the edge is a leading edge or a trailing edge of the aircraft structure, and the actuator and the cam body both extend in a direction that is aligned with the edge.

12. An aircraft including the aircraft structure of claim 10.

13. A part of an aircraft wing, comprising:
   multiple control surface devices arranged along an edge of the wing, being a leading edge or a trailing edge; and
   a plurality of the aircraft control surface deployment system of claim 1, wherein, for each of the plurality:
      the cam body is an elongate cam body, which, when moved in a first direction, causes a corresponding one of the control surface devices to move to a fully deployed position and, when moved in a second direction that is an opposite direction from the first direction, causes the corresponding one of the control surface devices to move away from the deployed position, and
      the actuator is a linear actuator including an actuator body and an actuator rod which is configured to drive a corresponding cam body of the plurality of cam bodies, the rod moving along an actuation axis, by extending from or retracting into the actuator body, so as to move the corresponding cam body in the first direction or the second direction;

the actuator and cam body both extend in a direction along the edge and are arranged side by side with respect to each other;

the first direction and the second direction are substantially aligned with the actuation axis always parallel;

the coupling mechanism comprises a coupling, which comprises:

a first pair of surfaces which:
transmit a force for the rod to drive the cam body in one direction as a result of one surface of the first pair of surfaces pushing against the other surface of the first pair of surfaces in a direction that is (i) substantially perpendicular to at least one surface of the first pair of surfaces, at a point of contact therebetween, and (ii) substantially parallel to the actuation axis; and simultaneously allow sliding motion between the surfaces to alleviate any loads resulting from misalignment of the cam axis and the actuation axis; and a second pair of surfaces which:
transmit a force for the rod to drive the cam body in the opposite direction as a result of one surface of the second pair of surfaces pushing against the other surface of the second pair of surfaces in a direction that is (i) substantially perpendicular to at least one surface of the second pair of surfaces, at a point of contact therebetween, and (ii) substantially parallel to the actuation axis; and simultaneously allow sliding motion between the surfaces to alleviate any loads resulting from misalignment of the cam axis and the actuation axis.

14. An aircraft including the part of the aircraft wing of claim 13.

15. A method of moving an aircraft control surface between a lowered position and a raised position using the aircraft control surface deployment system of claim 1, the method comprising:

moving the aircraft control surface from the lowered position to the raised position by actuating the actuator in the first direction, such that the actuator moves the cam body via the contact point between two surfaces that transmits a load in the first direction, while allowing movement between the two surfaces in a direction that is transverse to the first direction; and/or moving the aircraft control surface from the raised position to the lowered position by actuating the actuator in the second direction, such that the actuator moves the cam body via the contact point between the two surfaces that transmits a load in the second direction, while allowing movement between the two surfaces in a direction that is transverse to the second direction.

16. The method of moving an aircraft control surface of claim 15, comprising allowing a sliding movement along one of the two surfaces to allow movement between the two surfaces in the transverse direction.

17. The method of moving an aircraft control surface of claim 15, wherein the two surfaces comprise a first surface, which is crowned or rounded, and a second surface, which is substantially flat.

18. The aircraft control surface deployment system of claim 1, wherein:
the second portion of the coupling mechanism comprises a first rigid body; and
the first rigid body comprises:
a first face; and
a second face that is parallel to and opposite from the first face.

19. The aircraft control surface deployment system of claim 1, wherein:
the first contact point of the coupling mechanism is between a first pair of surfaces that transmit load in the first direction while allowing movement between the first pair of surfaces in a direction that is transverse to the first direction, a first surface of the first pair of surfaces being formed by the first portion of the coupling mechanism and a second surface of the first pair of surfaces being formed by the second portion of the coupling mechanism; and
the second contact point of the coupling mechanism is between a second pair of surfaces that transmit load in the second direction while allowing movement between the second pair of surfaces in a direction that is transverse to the second direction, a first surface of the second pair of surfaces being formed by the first portion of the coupling mechanism and a second surface of the second pair of surfaces being formed by the second portion of the coupling mechanism.

20. A method of moving an aircraft control surface between a lowered position and a raised position comprising using the aircraft control surface deployment system of claim 19, the method comprising:

moving the aircraft control surface from the lowered position to the raised position by actuating the actuator in the first direction, such that the actuator moves the cam body via the contact point between the two surfaces that transmits the load in the first direction, while allowing movement between the two surfaces in a direction that is transverse to the first direction; and/or moving the aircraft control surface from the raised position to the lowered position by actuating the actuator in the second direction, such that the actuator moves the cam body via the contact point between the two surfaces that transmits the load in the second direction, while allowing movement between the two surfaces in a direction that is transverse to the second direction.

* * * * *